W. Todd.
Rafting and Booming.

N° 21,386. Patented Aug. 31, 1858.

UNITED STATES PATENT OFFICE.

WILLIAM TODD, OF CHERRYFIELD, MAINE.

IMPLEMENT FOR ROLLING AND PILING LOGS.

Specification forming part of Letters Patent No. 21,386, dated August 31, 1858.

*To all whom it may concern:*

Be it known that I, WILLIAM TODD, of Cherryfield, in the county of Washington and State of Maine, have invented a new and useful Machine for Facilitating the Rolling and Piling of Logs and other Heavy Lumber; and I do hereby declare that the following is a full, clear, and exact description of the same, reference being had to the annexed drawings, making part of this specification.

Figure 1:
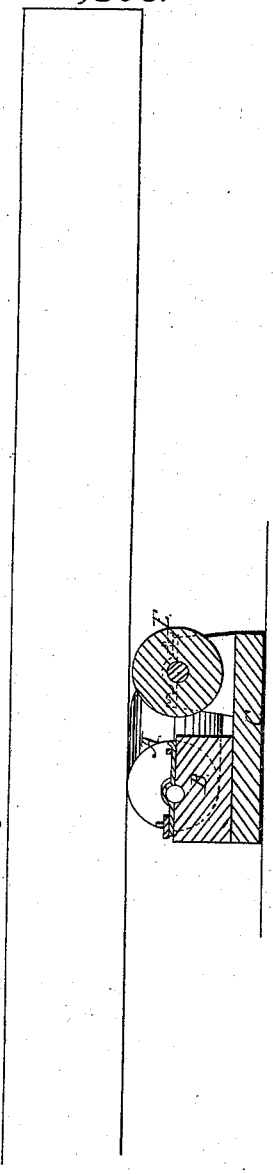
Figure 2:
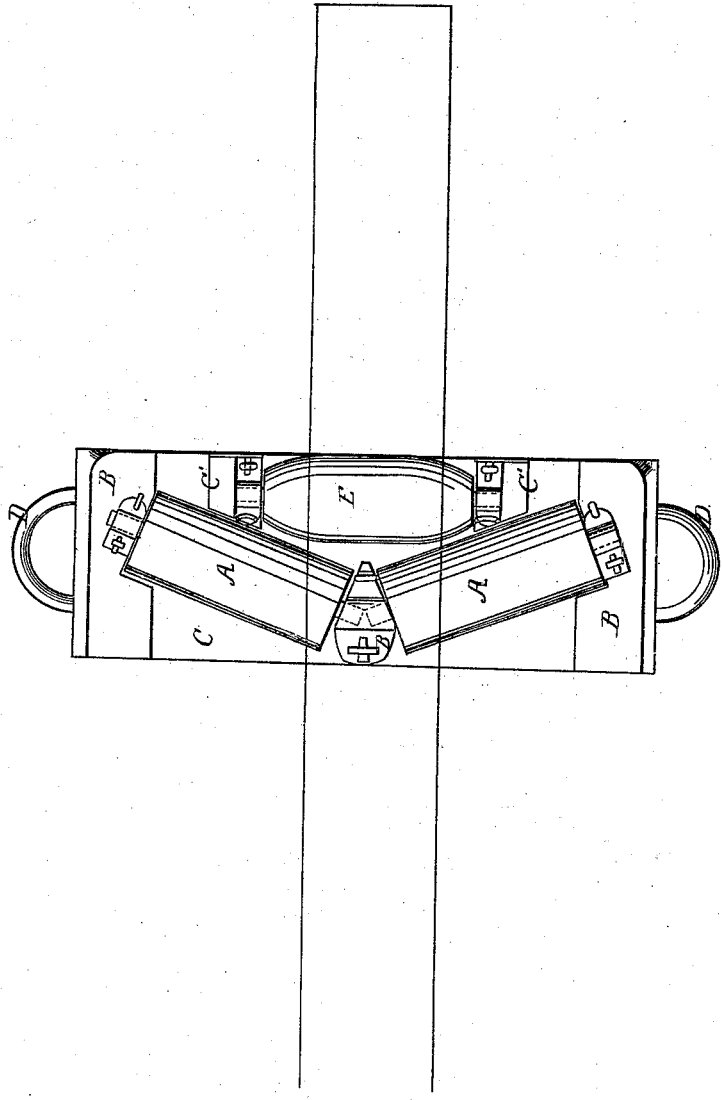

Figure 1 is a vertical section through the center of the machine with a log represented by red lines in the act of being rolled over the same. Fig. 2 is a top or bird's-eye view of the same.

Similar letters in the figures refer to corresponding parts.

The nature of this invention and improvement consists in combining and arranging two or more horizontal rollers at such an obtuse angle in relation to each other and acute angles to the axis of a tapering roller placed beside them as to enable heavy logs and other pieces of lumber to be rolled over the same and guided onto the tapering roller without regard to the longitudinal position of the said logs or pieces of lumber in reference to the position of the rollers in such a manner as to facilitate the movement of the logs or lumber when being moved from place to place or piled or placed on teams or on board vessels.

To enable others skilled in the art to make and use my invention, I will proceed to describe its construction and operation.

The cylindrical rollers A are supported in a horizontal position on suitable journals at an angle of about forty degrees (more or less) with each other. Their ends nearly touch, and their journals turn in suitable boxes secured in bearings or pedestal-timbers B, firmly fastened to a horizontal rectangular bed-timber C, provided with suitable handles D or other attachments for enabling the machine to be transported from place to place. Next the sides of these rollers A and on the same horizontal plane is arranged another roller E, whose ends are slightly curved and tapered and whose more central portion between the ends is cylindrical and equal in diameter to the rollers A, so as to bring this portion on a horizontal line with the upper parts of the said rollers A and at an acute angle with the same. The journals of this roller E turn in boxes secured to blocks or pedestal-timbers C', firmly fastened to the bed-timber D. Tapering the ends of this roller E enables its tapered parts to be brought immediately next and parallel with the sides of the rollers A, and the cylindrical part in such close proximity to the ends of the cylinders A as to prevent the log or other piece of timber being moved over the same from falling between the said ends of the rollers A, as it would otherwise often have a tendency to do in the course of its movements. The rollers A E thus arranged and secured on the bed-timber C are capable of being transported from place to place, and when desired to be used is brought in such relation to the log or heavy timber to be moved as to enable the end of the same to be readily raised and placed on either of the rollers A, and its opposite end to be also raised to the proper position to enable the said log or timber to be moved and guided over the said roller and roller E, the tapered ends of this last-mentioned roller causing it to be gradually brought on the cylindrical part of the same, from whence it can be rolled at right angles or any desired angle to its axis. In this manner the trunks of trees, heavy logs, and timbers of every description can be moved and guided over the rollers A E, the peculiar angular arrangement of the rollers A enabling them to be swung upon and guided over the same onto the roller E, whose position in relation to these rollers A prevent them from falling between the same, and allows them to be guided in the necessary direction on the rank, team, or vessel where they are designed to be placed.

What I claim as my invention, and desire to secure by Letters Patent, is—

The combination and arrangement of the tapered roller E with the diagonally-arranged cylindrical rollers A, for facilitating and guiding the movements of logs and heavy timbers and piling the same in ranks or on teams and vessels, substantially as described.

WILLIAM TODD.

Witnesses:
JAMES A. MILLIKEN,
ALBERT CHURCH.